United States Patent
Hottin et al.

(10) Patent No.: US 9,475,586 B2
(45) Date of Patent: Oct. 25, 2016

(54) METHOD FOR SEALING A FUEL TANK

(71) Applicant: DAHER AEROSPACE, Saint Julien de Chedon (FR)

(72) Inventors: Mathieu Hottin, Saint Aignan de Grandlieu (FR); Dominique Bailly, La Chevroliere (FR)

(73) Assignee: Daher Aerospace, Saint Julien de Chedon (FR)

(*) Notice: Subject to any disclaimer, the term of this patent is extended or adjusted under 35 U.S.C. 154(b) by 264 days.

(21) Appl. No.: 14/352,685

(22) PCT Filed: Oct. 29, 2012

(86) PCT No.: PCT/EP2012/071383
§ 371 (c)(1),
(2) Date: Apr. 17, 2014

(87) PCT Pub. No.: WO2013/060890
PCT Pub. Date: May 2, 2013

(65) Prior Publication Data
US 2014/0239122 A1    Aug. 28, 2014

(30) Foreign Application Priority Data

Oct. 28, 2011  (FR) .................................... 11 59817

(51) Int. Cl.
*B64D 37/02*  (2006.01)
*B64D 37/06*  (2006.01)
(Continued)

(52) U.S. Cl.
CPC ............. *B64D 37/06* (2013.01); *B29C 70/08* (2013.01); *B29C 70/086* (2013.01); *B29C 70/88* (2013.01); *B60K 15/03177* (2013.01); *B64C 3/34* (2013.01); *B29K 2063/00* (2013.01);
(Continued)

(58) Field of Classification Search
USPC ............................... 244/135 R, 133; 220/562
See application file for complete search history.

(56) References Cited

U.S. PATENT DOCUMENTS 3,396,923 A * 8/1968 Windecker ............. B64D 37/02
156/155
4,556,591 A * 12/1985 Bannink, Jr. ......... B29C 65/601
244/1 A
(Continued)

FOREIGN PATENT DOCUMENTS

| WO | 2007/045466 A1 | 4/2007 |
| WO | 2010/116170 A2 | 10/2010 |
| WO | 2012/007116 A2 | 1/2012 |

OTHER PUBLICATIONS

McKague, "Thermoplastic resins," In: D. B. Miracle & S. L. Donaldson: "Composites," Dec. 2001, vol. 21, pp. 132-140, ASM Handbook, USA.

*Primary Examiner* — Christopher P Ellis
(74) *Attorney, Agent, or Firm* — Im IP Law PLLC; C. Andrew Im

(57) ABSTRACT

A method for making a structural element comprising a panel in composite material with fiber reinforcement in an organic matrix obtained by laying up and curing. The panel comprises a side likely to be exposed to contact with hydrocarbons. The required layer structure is obtained by laying up the plies of fibers pre-impregnated with resin having a curing temperature T1. A ply made of a thin film of polymer that can withstand hydrocarbons and the curing temperature T1, referred to as the protective film, is applied on the side exposed to hydrocarbons. The entire layered structure is cured under pressure at the temperature T1.

9 Claims, 2 Drawing Sheets

(51) Int. Cl.
*B29C 70/88* (2006.01)
*B29C 70/08* (2006.01)
*B64C 3/34* (2006.01)
*B60K 15/03* (2006.01)
B29L 31/00 (2006.01)
B29K 63/00 (2006.01)
B29K 71/00 (2006.01)

(52) U.S. Cl.
CPC .... *B29K2071/00* (2013.01); *B29L 2031/7172* (2013.01); *Y02T 50/433* (2013.01); *Y10T 156/1062* (2015.01)

(56) References Cited

U.S. PATENT DOCUMENTS

| | | | | |
|---|---|---|---|---|
| 5,637,272 A * | 6/1997 | Yamamoto | B29C 33/0033 | 264/156 |
| 5,830,548 A * | 11/1998 | Andersen | B28B 1/00 | 206/524.3 |
| 6,638,466 B1 * | 10/2003 | Abbott | B29C 33/68 | 264/238 |
| 6,790,526 B2 * | 9/2004 | Vargo | B32B 7/12 | 428/343 |
| 8,248,748 B2 * | 8/2012 | Ciolczyk | F16L 9/125 | 361/212 |
| 8,333,864 B2 * | 12/2012 | Brennan | B29C 70/44 | 156/285 |
| 8,550,403 B2 * | 10/2013 | Yamaguchi | B64C 3/34 | 220/562 |
| 8,616,499 B2 * | 12/2013 | Tucker | B64C 3/18 | 244/123.1 |
| 8,800,924 B2 * | 8/2014 | Groves | B64C 3/22 | 244/123.1 |
| 8,899,936 B2 * | 12/2014 | Hancock | B25B 11/02 | 29/889.72 |
| 9,090,355 B2 * | 7/2015 | Yamaguchi | B64D 37/32 | |
| 2004/0149759 A1 * | 8/2004 | Moser | F17C 1/10 | 220/581 |
| 2006/0063056 A1 * | 3/2006 | Yasuda | H01M 8/04186 | 429/410 |
| 2008/0035574 A1 * | 2/2008 | Sabottke | B01D 61/246 | 210/651 |
| 2010/0104810 A1 * | 4/2010 | Fukazawa | C03C 1/008 | 428/147 |
| 2013/0266866 A1 * | 10/2013 | Miyazaki | H01M 2/1686 | 429/220 |

* cited by examiner

METHOD FOR SEALING A FUEL TANK

RELATED APPLICATIONS

This application is a §371 application from PCT/EP2012/071383 filed Oct. 29, 2012, which claims priority from French Patent Application No. 11 59817 filed Oct. 28, 2011, each of which is herein incorporated by reference in its entirety.

TECHNICAL FIELD OF THE INVENTION

The invention relates to a method for sealing a fuel tank. The invention is particularly suited to fuel tanks of aircraft, formed by assembling elements made of composite materials with fiber reinforcement.

BACKGROUND OF THE INVENTION

The fuel tank of an aircraft is generally placed in the empty volume of a box structure, particularly in the wing structure. In order to contain fuel, said volume must be sealed and also, the materials that make up said box structure must be protected from possible damage due to contact with fuel. That last characteristic is particularly relevant when the materials making up the box structure are composite materials with an organic matrix, on which fuel hydrocarbons act as solvents.

According to the prior art, such protection can be obtained by inserting a bag in the empty volume of the box structure used as a tank. This solution is unfavorable for aeronautics applications as the bag constitutes additional mass. Further, the internal shape of the empty volume, which is essentially determined by structural considerations, can be complex and both the adaptation of the shape of the bag to the volume and the introduction of said bag in the volume are difficult.

Another solution of the prior art consists in painting the structural parts that demarcate the empty volume of the box structure with special primer that is resistant to hydrocarbons. This technical solution requires a painting operation in the manufacturing sequence and its quality of performance depends on the know-how of the operator.

Finally, in a third solution of the prior art, protection is provided by applying liquid filler made of polythioether on the inside of the empty volume of the assembled box structure. This operation, which is generally carried out with a brush, is commonly called churning, and happens to be particularly difficult to carry out.

The document WO 2007 045466 describes a fuel tank in composite material with an organic matrix, and methods for manufacturing such a tank. The fuel tank described in this document of the prior art is designed for a motorcycle or automotive vehicle and is a small tank. The document discloses two embodiments of such a tank, the first consisting in molding an enclosure made up of thermoplastic material on which reinforced plies are then laid up. The second embodiment consists in first making an enclosure of layered composite material and then covering, after curing, the inside of the enclosure with thermoplastic film by blowing or rotary molding the film inside the volume of the tank made up in this way. These embodiments are totally unsuitable for making a tank intended for an aircraft.

OBJECT AND SUMMARY OF THE INVENTION

The invention is aimed at remedying the drawbacks of the prior art; to that end, it relates to a method for making a structural element comprising a panel in composite material with fiber reinforcement in an organic matrix obtained by laying up and curing, which panel comprises a side that is liable to be exposed to contact with hydrocarbons, wherein said method comprises the steps of:
  a. laying up the plies of fibers pre-impregnated with resin having a first curing temperature, T1, so as to obtain the required layered structure;
  b. applying on the side exposed to hydrocarbons a ply made up of a thin film of a polymer that can withstand hydrocarbons and the curing temperature T1, referred to as the protective film;
  c. curing the entire layered structure under pressure at the temperature T1.

Thus, the protection of the exposed surface is obtained while manufacturing the elements that make up the box structure at the stage of the elementary part and the application of the protection does not modify the time for assembling the structure. During the application of protection, the parts are fully accessible and protection is applied evenly over the entire surface coated by the film. Joint curing of the film and the part makes the film bond with the protected surface. The film is fine and so the added mass is small.

The invention can be implemented according to the advantageous embodiments described below, which can be considered individually or in any technically operative combination.

In an advantageous embodiment, the matrix is made up of epoxy thermosetting resin and the protective film is made of polyetheretherketone (PEEK) polymer that is between 0.015 mm and 0.035 mm thick.

Thus, the properties of the PEEK film are not affected by the curing of the epoxy resin, said film is besides perfectly resistant to the hydrocarbons used as aircraft fuel, and only adds a mass of a few grams per square meter of surface to which it is applied.

Advantageously, the protective film applied in step (b) of the method according to the invention does not cover the totality of the side exposed to hydrocarbons. Thus, the method according to the invention makes it possible to keep areas that are not covered by the protective film, particularly for gluing or assembly with other parts.

According to this embodiment, step (b) of the method according to the invention comprises the operations of:
  b.i. cutting the protective film to the required contour;
  b.ii. projecting the location of the areas not covered by the protective film;
  b.iii. applying the film on the layered structure away from the areas demarcated in that manner.

Advantageously, one side of the protective film is treated to make it more wettable. Thus, the bonding of the film with the resin after the resin is cured is improved.

Advantageously, the protective film comprises a layer of pressure-sensitive adhesive or PSA on one of its sides. Thus the application of the film on the layered structure is made easier, particularly when said layered structure is not tacky. PSA stands for Pressure Sensitive Adhesive.

In a particular embodiment, the protective film is applied in several strips with overlaps at the edges of said strips. Thus, the method according to the invention is suited for covering large elementary parts while sealing the applied strips of protective film to each other.

Advantageously, the method according to the invention comprises, between steps (b) and (c), a step of:
  d. compacting the layered structure and the film under a vacuum bag.

Thus, the film bonds mechanically with the layered structure.

The invention also relates to a method for manufacturing a box structure comprising a volume adapted to contain fuel, which method comprises the steps of:
i. obtaining a plurality of parts making up the box structure according to an embodiment of the previous method;
ii. assembling said parts so as to constitute the structure;
iii. completing the sealing of the structure made up in this way at the assembly interfaces.

Thus, the operations for protecting the box structure and sealing it are limited to the treatment of the assembly interfaces.

According to a particular embodiment, step (ii) of the method is carried out by riveting.

According to an alternative embodiment, step (ii) of the method is carried out by gluing.

The invention also relates to an aircraft comprising a box structure, an empty volume of which is used as a fuel tank, wherein said box structure comprises a structural element comprising a composite panel with fiber reinforcement obtained according to the method of the invention. The use of composite materials for making up that box structure associated with the mode of protection of these materials makes it possible to save mass compared to the known solutions of the prior art and facilitate the making of such a structure. Thus, the aircraft according to the invention is advantageous in terms of both the manufacturing cost and the operating cost.

BRIEF DESCRIPTION OF THE DRAWINGS

The invention is described below in its preferred embodiments, which are not limitative in any way, and by reference to FIGS. 1 to 4, wherein.

DETAILED DESCRIPTION OF THE EMBODIMENTS

Figure 1:
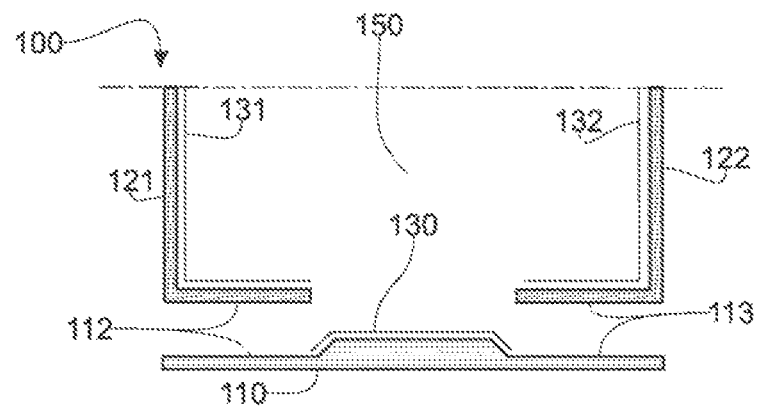
FIG. 1 is a partial sectional exploded view of an exemplary embodiment of a box structure according to the invention.

In FIG. 1, according to an exemplary embodiment, the box structure (100) according to the invention is made up of a plurality of elementary parts (110, 121, 122) made up of composite material with fiber reinforcement. As a non-limitative example, said composite material comprises carbon fibers in an epoxy resin matrix. The elementary parts are assembled along assembly interfaces (112, 113). The assembly may be made by gluing or by co-curing. Alternatively or jointly, the assembly may be made by riveting. These assembly techniques are known in the prior art and are not described further. The inside volume (150) of the box structure is liable to contain fuel. In order to protect the elementary parts (121, 122, 110) from contacting with the fuel, the exposed sides of the parts are coated by a protective film (130, 131, 132) applied to said sides while making the elementary parts (110, 121, 122). In a preferred embodiment, that protective film is made of polyetheretherketone or PEEK. Such film is for example marketed under the trademark APTIV® by VICTREX®.

Figure 2:
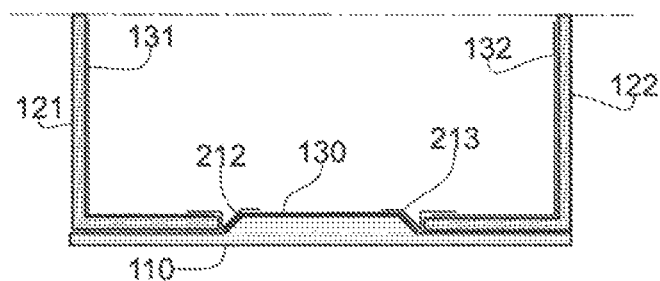
FIG. 2 represents the same view as FIG. 1 of the same box structure after assembly.

In FIG. 2 after assembly, the interstices remaining between the elementary parts are filled by filler beads (212, 213) so as to complete the sealing of the assembly. The filler used is a filler that resists hydrocarbons, for example a filler made from polythioether distributed under the name PR by Le Joint Français®.

Figure 3:
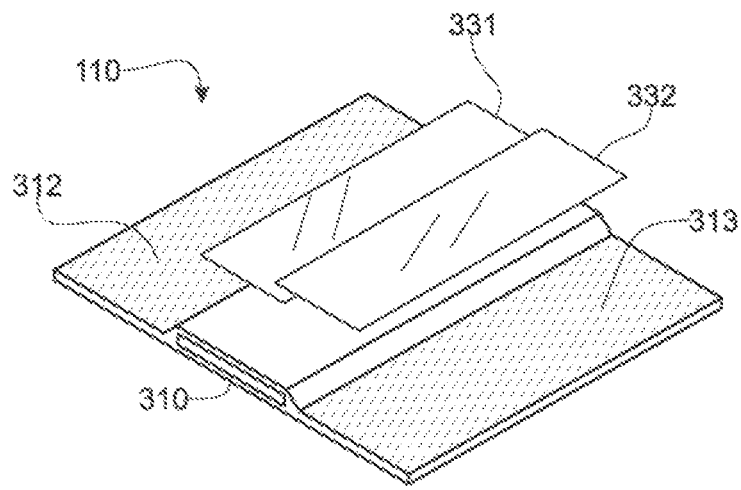
FIG. 3 is a perspective exploded view of one of the elementary parts of the box structure of FIGS. 1 and 2 during the making of said elementary part.

In FIG. 3, in an exemplary embodiment of an elementary part (110) of the box structure according to the invention, said part is made by laying up plies of pre-impregnated fibers. According to a particular embodiment, laying up can be achieved partly around a core (310), for example around a honeycomb plate. Such laying up may be automatic or manual. The protective film is placed on the area exposed to fuel of the preform of the part (110), for example in the form of a plurality (331, 332) of strips of PEEK film. Each strip (331, 332) comprises an overlap area with the strip lying next to it, so that the join between the two strips is sealed. The areas (312, 313) that form an interface with the other elementary parts for the assembly of the box structure are not covered by the protective film (331, 332). The protective film is represented here with a straight cut. In practice, the contour of the film may be more complex, so as to arrange resists (331, 332) also with more complex shapes. In that case, the strips (331, 332) of protective film are cut to the required shape before they are placed. The operation of placing protective film is carried out manually. It is made significantly easier by the fact that the elementary part is placed flat and is accessible from all sides during the operation. The protective film may also be cut into several strips so as to make them easier to handle. To assist the operator while applying said protective film, the contour of the strip to place on the preform can be projected by laser on said preform according to a known method of the prior art for manual laying up. According to the size of the elementary part, the strips of protective film are stabilized on the structure during application, thanks to the tack of the plies laid up previously. When the dimensions of the part are large, the strips of protective film may be applied on the preform by vacuum bag compacting just before said preform is cured. The protective film is advantageously treated on the side in contact with the resin making up the matrix of the part, by a method aimed at making it more wettable, so as to improve the bonding between the film and the part over its entire surface. Such treatment consists in increasing the surface free energy of the film so that it is greater than that of the liquid resin and that said resin correctly wets the surface of the film during the curing operation. In the case of a PEEK film, such treatment is carried out by plasma, UV or ozone, without the list being comprehensive, and makes it possible to increase the surface free energy of the side treated in this way to a value ranging between 55 and 60 Joules.m$^{-1}$. If several strips are placed with an overlap of the edges of adjacent strips, the wettability improvement treatment is applied to both sides of the protective film.

If the plies of fiber laid up are slightly pre-impregnated, for example with a rate of resin below 5%, commonly called 'dry fibers', the strips of protective film can be coated on all or part of their side in contact with the layered structure, by pressure-sensitive adhesive or PSA, for example with silicone-based adhesive, in order to make them easier to install. Thus, the method according to the invention is also suitable for making parts from dry fibers, particularly by injection or infusion of resin.

Figure 4:
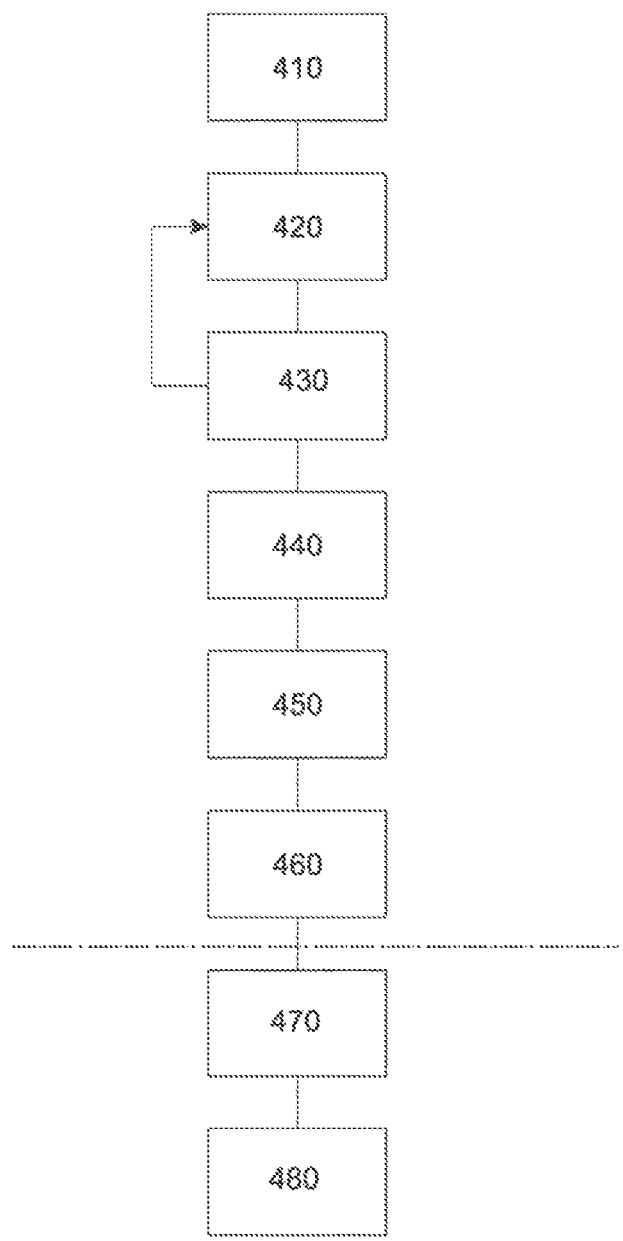
FIG. 4 is a chart showing the steps of this method according to an exemplary embodiment of the invention.

In FIG. 4, the method according to the invention comprises a first series of steps for making elementary parts.

Thus, for each elementary part, a first step (410) of laying up makes it possible to constitute the preform of the part. During a preparatory step (420) the protective film is cut along the required contour to cover all or part of the surface of the part exposed to hydrocarbons. The strip of film cut in this manner is placed on the preform during a step (430) of applying said strip. The strip is held on the preform by the tack of the pre-impregnated plies laid up previously, or by the presence of PSA type adhesive on all or part of the surface of the strip in contact with the preform. The previous steps (420, 430) are repeated with different strips till the entire surface exposed to hydrocarbons of the part is covered. When said exposed surface is entirely covered, the preform is bagged during a bagging step (440) and the assembly is compacted in a compacting step (450) by applying a vacuum to it inside the bag.

The preform is then directed to an autoclave for a curing step (460). According to the exemplary embodiment where the layering of the preform is made up of carbon fibers in epoxy resin, curing is carried out at a temperature T1 of about 180° C. The protective film made up of PEEK is fully resistant to that temperature T1 without undergoing damage, that is without the film melting or losing sealing. In a particular embodiment, curing may be done in part, so as to retain a possibility of assembly by co-curing.

The elementary parts are made and protected by a protective film on their sides exposed to fuel, and they are assembled during an assembly step (470). The assembly may be made by gluing, riveting or co-curing using known methods of the prior art. During a completion step (480), the sealing of the interstices between the parts assembled in this manner is achieved by applying beads of filler.

The description above and the exemplary embodiments show that the invention achieves the objectives sought, in particular it makes it possible to obtain a box structure made of composite material with fiber reinforcement, said box structure comprising an empty volume adapted to contain fuel, which structure is achieved in a cost-effective and reproducible manner with low added mass to obtain the sealing of said empty volume and the protection of structural materials from contact with hydrocarbons.

The invention claimed is:

1. A method for making a structural element for use in an aircraft fuel tank comprising a panel in composite material with fiber reinforcement in an organic matrix obtained by laying up and curing, comprising the steps of:

laying up plies of fibers pre-impregnated with resin having a curing temperature T1 to obtain a layered structure;

applying on a side of the panel exposed to hydrocarbons a ply made of a protective film of a polymer that can withstand hydrocarbons and the curing temperature T1, such that the protective film does not entirely cover the side exposed to hydrocarbons, by:

cutting the protective film to a required contour;

projecting a location of areas on the side not covered by the protective film:

applying the protective film on the layered structure away from the areas thus delimited; and curing entire layered structure under pressure at the curing temperature T1.

2. The method according to claim 1, wherein the organic matrix is made of epoxy thermoset resin; and wherein the protective film is made of polyetheretherketone (PEEK) polymer that is between 0.015 mm and 0.035 mm thick.

3. The method according to claim 1, further comprising the step of treating one side of the protective film to make it more wettable than a non-treated side of the protective film.

4. The method according to claim 1, wherein the protective film comprises a layer of pressure-sensitive adhesive on one of its sides.

5. The method according to claim 1, further comprising the step of applying the protective film in strips with overlaps at edges of the strips.

6. The method according to claim 1, further comprising the step of compacting the layered structure and the protective film under a vacuum bag before the step of applying.

7. A method for manufacturing a box structure comprising an inside volume configured to contain fuel, comprising the steps of:

obtaining a plurality of parts for the box structure according to the method of claim 1;

assembling the parts to form the box structure; and sealing of the box structure at the assembly interfaces.

8. The method according to claim 7, wherein the step of assembling is performed by riveting.

9. The method according to claim 7, wherein the step of assembling is performed by gluing.

* * * * *